(12) United States Patent
Imamura et al.

(10) Patent No.: US 6,519,401 B1
(45) Date of Patent: Feb. 11, 2003

(54) LIGHT FIBERS AND METHODS FOR PRODUCING THE SAME

(75) Inventors: Kengo Imamura, Sagamihara (JP); Kenji Matsumoto, Kawasaki (JP); Atsushi Udagawa, Sagamihara (JP); Shinichi Irie, Yamato (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/830,510

(22) PCT Filed: Oct. 26, 1999

(86) PCT No.: PCT/US99/25115
§ 371 (c)(1),
(2), (4) Date: Apr. 27, 2001

(87) PCT Pub. No.: WO00/25159
PCT Pub. Date: May 4, 2000

(30) Foreign Application Priority Data

Oct. 28, 1998 (JP) ............................................. 10-307165

(51) Int. Cl.[7] .............................. G02B 6/16; F21V 8/00
(52) U.S. Cl. ....................... 385/123; 385/147; 385/901; 362/558; 362/559
(58) Field of Search ......................... 385/31, 123, 147, 385/901; 362/558, 559, 560, 565, 581, 582

(56) References Cited

U.S. PATENT DOCUMENTS

| 4,422,719 A | 12/1983 | Orcutt |
| 4,471,412 A | * 9/1984 | Mori |
| 4,883,338 A | 11/1989 | Abe et al. |
| 5,027,259 A | 6/1991 | Chujko |
| 5,168,540 A | 12/1992 | Winn et al. |
| 5,692,088 A | 11/1997 | Ishiharada et al. |
| 5,982,969 A | 11/1999 | Sugiyama et al. |
| 6,091,878 A | 7/2000 | Abramowicz et al. |
| 6,301,418 B1 | * 10/2001 | Freier et al. ................. 385/123 |
| 6,366,719 B1 | * 4/2002 | Heath et al. .................. 385/31 |

FOREIGN PATENT DOCUMENTS

| EP | 0 273 311 | 7/1988 |
| EP | 0 615 141 | 9/1994 |
| EP | 0 629 493 | 12/1994 |
| EP | 0 841 151 | 5/1998 |
| JP | 51-29951 | 8/1976 |
| JP | 6-118238 | 4/1994 |
| JP | 6-331830 | 12/1994 |
| JP | 7-84131 | 3/1995 |
| JP | 7-78564 | 8/1995 |
| JP | 7-198948 | 8/1995 |
| JP | 8-94862 | 4/1996 |

OTHER PUBLICATIONS

OptiFlex™ Flexible Light Pipe Side Light Fiber by Rohm and Haas Company, date unknown.

* cited by examiner

Primary Examiner—Hemang Sanghavi
(74) Attorney, Agent, or Firm—Stephen W. Buckingham

(57) ABSTRACT

To provide a side light extraction type light fiber capable of extracting light having high brightness at a viewing angle. Means for solving: a light fiber comprising: a core (1) in the center portion, and a cladding arranged around the core, characterized in that the cladding comprises: (i) a light diffusive layer (3) comprising a light diffusive portion made of a light diffusive material containing, as a binder, a polymer having a refractive index smaller than that of the core, which is provided in closely contact with the core in a wall thickness of 1 to 300 μm in a circumferential direction, and (ii) a protective layer (4) made of a light transmitting resin material, which is formed to integrate with the light diffusive layer and covers the light diffusive layer.

4 Claims, 2 Drawing Sheets

LIGHT FIBERS AND METHODS FOR PRODUCING THE SAME

DETAILED DESCRIPTION OF THE INVENTION

1. Technical Field of the Invention

The present invention relates to a light fiber (optical fiber) and, more particularly, to a so-called "side light extraction" type light fiber for emitting incident light from at least one end in a longitudinal direction of core through a cladding arranged around the core (i.e. side surface). The present invention also relates to a method of producing such a side light extraction type light fiber.

2. Prior Art

As is well known, a discharge tube such as fluorescent lamp emits visible light in a specific wavelength range, and is normally used for the purpose of illuminating. In case that the discharge tube is a neon tubing, it is also used in the form of a so-called neon sign for the purpose of displaying an advertisement, decoration or the like.

The discharge tube is capable of emitting light by applying a voltage. At this time, the discharge tube generally generates heat. Accordingly, it is necessary to use the discharge tube taking leak and heat generation into consideration. Therefore, it substantially becomes impossible to use the discharge tube, for example, for the purpose of illuminating in water or displaying.

Recently an intense has been shown towards a light emitting device wherein a light source is arranged at a long distance from a place where illumination or display is performed (hereinafter also referred to as an "illuminating place", or a "displaying place", in order to realize the above-described illumination or display. Such a light emitting device comprises a light fiber arranged at a distance from the light source, and is capable of performing desired illumination in the vicinity of the illuminating place, or displaying in the same manner. Generally, the light fiber comprises a so-called core capable of transferring incident light from one end of the fiber to the other end in a center portion, and a cladding having a refractive index smaller than that of the core in an peripheral portion.

Among light fibers, there is known a side light extraction type light fiber which makes it possible to extract light from the side portion. Describing such a light fiber with reference to FIG. 4, a light fiber 20 comprises a core 21 made, for example, of an acrylate resin and a cladding 22 made, for example, of Teflon™ and has flexibility, as disclosed in U.S. Pat. No. 4,422,719. This cladding 22 uniformly contains a light scattering material 25 made of metal oxide particles such as titanium dioxide particles in the amount of 2 to 10% by weight. Japanese Unexamined Patent Publication (Kokai) No. 10-148725 discloses a light fiber formed by co-extrusion of a molten fluoropolymer containing 50–4000 ppm of at least one light scattering additive and a crosslinkable core mixture. Furthermore, International Publication WO 98/08024 discloses a light fiber wherein a semitransparent cladding containing a pigment of a white color or the other color is provided around a core by melt casting.

In the light fibers constructed as described above, a portion of light can be uniformly extracted out through the cladding when incident light from one end or both ends of the fiber. To make it possible to uniformly extract out from the side portion, a plastic light fiber having a diameter of not less than 1 mm coated with a semitransparent resin is also disclosed in Japanese Unexamined Patent Publication (Kokai) No. 5-341125.

Furthermore, Japanese Unexamined Patent Publication (Kokai) No. 10-142428 discloses a light illuminating rod which has made it possible to extract light from the side portion in a specific direction. This light illuminating rod generally comprises a flexible rod member as a core in a center portion, and a transparent cladding layer having a refractive index smaller than that of the core, which is attached to a peripheral portion of this flexible rod member. A light diffusive reflective film made of a light transmitting polymer containing light diffusive reflective particles dispersed therein is partially present between the core and the cladding layer in a longitudinal direction. In case of such a light illuminating rod, when incident light from one end is transmitted to the other end, a portion of light is diffused and reflected by the light diffusive reflective film, thereby to extract from the peripheral portion of the rod member located opposite to the bond surface of the light diffusive reflective film and the core.

Problems to be Solved by the Invention

Among light fibers of the prior art the cladding disclosed in U.S. Pat. No. 4,422,719 or Japanese Unexamined Patent Publication (Kokai) No. 10-148725 contains a predetermined amount of a light scattering material or a light scattering additive, but its thickness is not controlled. In case of the cladding disclosed in WO 98/08024, neither amount of the pigment nor thickness are controlled.

Furthermore, since the light fiber disclosed in Japanese Unexamined Patent Publication (Kokai) No. 5-341125 has not a structure wherein the semitransparent resin is directly contacted with the core for transmitting light, light can not be efficiently extracted out from the side portion.

In contrast with these light fibers the light illuminating rod disclosed in Japanese Unexamined Patent Publication (Kokai) No. 10-142428 can efficiently extract out light from the side portion. However, an extraction direction of light is limited to only a specific direction as described above. Accordingly, this light illuminating rod can be extracted at a large viewing angle like a neon tubing.

Thus, an object of the present invention is to provide a side light extraction type light fiber capable of extracting light having high rightness at a large viewing angle, and a method of producing a light fiber, capable of simply producing the same.

Means for Solving the Problem

According to the present invention, as the means to solve the above problems, there is provided a light fiber comprising:

a core in the center portion, and a cladding arranged around said core, characterized in that said cladding comprises:

a light diffusive layer comprising a light diffusive portion made of a light diffusive material containing, as a binder, a polymer having a refractive index smaller than that of said core, which is provided in closely contact with said core in a wall thickness of 1 to 300 μm in a circumferential direction, and a protective layer made of a light transmitting resin material, which is formed to integrate with said light diffusive layer and covers said light diffusive layer. In this light fiber, the light diffusive material preferably contains a light scattering material in an amount of 0.01 to 10% by weight.

According to the present invention, there is also provided a method of producing a light fiber comprising a core in the center portion and a cladding arranged around said core, characterized in that said cladding is formed by co-extrusion of a light diffusive material containing, as a binder, a polymer having a refractive index smaller than that of said core and a light transmitting resin material so that the resulting cladding comprises:

a light diffusive layer comprising a light diffusive portion made of said light diffusive material containing, which is provided in closely contact with said core in a wall thickness of 1 to 300 μm in a circumferential direction, and a protective layer made of said light transmitting resin material which is integrated with said light diffusive layer and covers said light diffusive layer. In this method, it is preferred that a light scattering material is contained in an amount of 0.01 to 10% by weight in the light diffusive material.

Mode for Carrying Out the Invention

The present invention will be described in accordance with its typical embodiments. In the drawings used as a reference for the description, identical or corresponding portions are identified with the same reference numerals.

In the perspective view of FIG. 1, a light fiber 10 as one embodiment of the present invention is shown. This light fiber basically comprises a so-called core 1 in a center portion, and a cladding 2 made of a polymer having a refractive index smaller than that of the core 1.

The core 1 is formed of a light transmitting material such as quartz glass, optical glass or polymer in the solid form, and has a refractive index of 1.4 to 2.0. In view of flexibility and light transmitting property, the core is preferably made of a polymer having a refractive index of normally 1.4 to 1.7, and preferably about 1.5. When the core is formed from a polymer, there can be used a light transmitting polymer such as acrylate polymer, polymethylpentene, ethylene-vinyl acetate copolymer, polyvinyl chloride, vinyl acetate-vinyl chloride or the like. To impart heat resistance to the core itself, the polymer can be crosslinked.

Describing in more detail, a solid core is advantageously formed from an acrylic polymer by preparing an acrylate monomer (mixture or monomer alone) used as a raw material as a core precursor as described below, pouring Into a cladding and heating to a polmerization initiation temperature.

As the acrylate monomer as the raw material of the core, for example, there can be used (i) (meth)acrylate wherein a glass transition temperature (Tg) of a homopolymer is higher than 0° C. (e.g. n-butyl methacrylate, methyl methacrylate, 2-hydroxyethyl methacrylate, n-propyl methacrylate, phenyl methacrylate, etc.), (ii) (meth)acrylate wherein a glass transition temperature (Tg) of a homopolymer is less than 0° C. (e.g. 2-ethylhexyl methacrylate, ethyl acrylate, tridecyl methacrylate, dodecyl methacrylate, etc.) or a mixture of (i) and (ii). In case of the mixture of (i) and (ii), a mixing weight ratio (H:L) of (meth)acrylate (H) of (i) to (meth)acrylate (L) of (ii) is normally within a range from 15:85 to 60:40. As a crosslinking agent, a polyfunctional monomer such as diallyl phthalate, triethylene glycol di(meth)acrylate, diethylene glycol bisallyl carbonate or the like can also be added to the above mixture.

The acrylate core formed as described above can be converted into a uniform polymer from one end to the other end in a longitudinal direction of the core, and has good light transmitting performance and a sufficient mechanical strength to deflection of the core itself. Therefore, the acrylate core is particularly suited to form a light fiber having a length of not less than 2 m.

The light transmitting material constituting the core 1 is generally a solid, but is not limited thereto. The light transmitting material may be made of a liquid containing a polyvalent alcohol such as aqueous solution of an inorganic salt, ethylene glycol, glycerin or the like; silicone oil such as polydimethylsiloxane, polyphenylethylsiloxane or the like; hydrocarbon such as polyethers, polyesters, liquid paraffin or the like; halogenated hydrocarbon such as ethylene trifluoride chloride oil or the like; or phosphates such as tri(chloroethyl)phosphate, trioctyl phosphate or the like. When the core is made of a liquid, the core is generally enclosed in a flexible tube made of a resin.

The shape of the cross section of the core 1 in a width direction (direction intersected perpendicularly to a longitudinal direction) is not specifically limited as far as the effect of the present invention is not adversely affected. For example, it is a geometric shape capable of retaining flexibility of the core, such as circle, ellipse, semicircle, segment having an area larger than that of the semicircle or the like. The diameter of the core is normally form 3 to 40 mm, preferably from 5 to 30 mm, when the cross section in the width direction has a circular shape.

Preferably, a cladding 2 of a light fiber 10 comprises:

a light diffusive layer 3 made of a light diffusive material containing, as a binder, a polymer having a refractive index smaller than that of the core, which is provided in closely contact with the core in a wall thickness of 1 to 300 μm in a circumferential direction, and a protective layer 4 made of a light transmitting resin material, which is formed to integrate with the light diffusive layer 3 and covers the light diffusive layer 3.

When the core 1 is made of the above-described polymer having a refractive index of about 1.5, the light diffusive material of the light diffusive layer 3 preferably contains a light transmitting fluorine polymer having a refractive index of 1.34 to 1.43, which is smaller than that of the polymer, such as tetrafluoroethylene-hexafluoropropylene copolymer (FEP), tetrafluoroethylene-ethylene copolymer (ETFE) or tetrafluoroethylene-hexafluoropropylene-vinylidene fluoride copolymer (THV) as a binder. The light diffusive material preferably contains, for example, a light scattering material 5 having a particle size of about 10 nm to 300 μm, together with this binder.

As the light scattering material, beads consisting of glass or other materials or titanium dioxide particles are generally used. The light scattering material may also be those other than titanium dioxide as far as the effect of the present invention is not adversely affected. Specific examples thereof include white inorganic powder and coloring pigment, which have a refractive index within a range from 1.5 to 3.0. As the white inorganic powder, for example, barium sulfate (refractive index: 1.51), magnesia (refractive index: 1.8), titania (refractive index: 2.6) or the like is preferred. It is also possible to contain a coloring material such as fluorescent dye, together with a light scattering material and to extract white light fed to the core as colored light.

The light scattering material is preferably contained in the light diffusive material in the amount of 0.01 to 10% by weight because the brightness can be easily controlled. If the content of this light scattering material is smaller by far than 0.01% by weight, there is a fear that a sufficient brightness (e.g. not less than 1000 cd/m$^2$ in case of white light emission) required as a light emitting material capable of being replaced by a neon tubing is not obtained even if the intensity (dissipation power) of a light source. On the other hand, when the content is larger by far than 10% by weight, there is a fear that a comparatively long (e.g. not less than 2 m) light fiber is not capable of uniformly emitting light over an overall length.

In the practice of the present invention, the binder polymer constituting the light diffusive material may also be those other than the fluorine polymer described above, however, the polymer used herein must have a refractive index lower than that of the core.

In this embodiment, the light diffuse layer 3 has a thickness of 1 to 300 μm in the circumferential direction as a result of control of the thickness. In such a case, the light shielding effect by the light diffusive layer 3 can be inhibited as small as possible. That is, as shown in FIG. 2, even when light is extracted out from the side portion of the light fiber 10 at a wide viewing angle while light from the light source 11 is introduced into at least one end thereof and then transmitted the brightness is not lowered by the light diffusive layer 3.

Accordingly, this light fiber 10 is capable of extracting light having a comparatively high brightness from the whole side portion. As shown in FIG. 3, when this light fiber 10 is held in a commercially available rail 12 having a light diffuse reflective surface inside, U rail (white) manufactured by Sumitomo 3M Co., the brightness of light having directivity is remarkably improved. Also, when light from the light source 11 shown in FIG. 2 is visible light having a fixed wavelength range, the color is clearly perceptible. If the thickness of the light diffusive layer 3 is not controlled and the thickness is larger than 300 μm, when light is introduced into one end or both ends of the light fiber in both cases, light is drastically shielded by the light scattering material, light scattering additive or pigment and there is a fear that it becomes impossible to efficiently extract out light from the side portion of the light fiber.

To protect the light diffusive layer 3 reduced in thickness as described above, the cladding 2 of this embodiment is made of a transparent, that is, light transmitting resin material, and has a protective layer 4 for covering the light diffusive layer 3, which is formed to integrate with the light diffusive layer 3. At this time, the resin material of the protective layer 4 is made of the above fluorine polymer constituting the light diffusive layer 3, and may have the same refractive index as that of the fluorine polymer. Alternatively, the resin material of the protective layer 4 is made of a material other than the fluorine polymer, and may have a refractive index different from that of the fluorine polymer. As far as the resin material of the protective layer 4 has light transmitting property, the resin material may contain a colored pigment or dye, thereby enabling the light fiber to emit visible light.

In the light fiber of the present invention, the emission brightness is not specifically limited as far as the effect of the present invention is not adversely affected. For example, when light is introduced from both ends of the core by using a metal halide lamp capable of emitting light of 130 W, the measured value is normally not less than 1000 cd/m$^2$, and preferably not less than 2000 cd/m$^2$, over an overall length of the fiber. In case of such a brightness, the light fiber of the present invention can be widely used as a linear light emitting material capable of being replaced by a neon tubing. The absolute value of the brightness can be easily enhanced if the dissipation power of the light source is further increased.

When the light fiber is used as the linear light emitting material capable of being replaced by a neon tubing, the light source is preferably arranged so that light is introduced into the core from one end or both ends of the core. When light is introduced only from one end, it is effective to further enhance the uniformity of light emission that a reflective film is arranged on the other end of the core so that the light reached the other end is reflected into the core.

By the way, the length of the light fiber of the present invention can widely vary according to its use and desired effect, but is normally within a range from 2 to 50 m, preferably from 2.5 to 10 m, and more preferably from 3 to 5 mm. When the length is smaller than 2 m, there is a fear that the light fiber is not suited for use as a neon light emitting device. On the other hand, when the length exceeds 50 m, there is a fear that the uniformity of the brightness over an overall length of the light fiber is lowered.

As the light source, there can be used a normal light source such as metal halide lamp, xenone lamp, halogen lamp, light emitting diode, fluorescent lamp or the like. The dissipation power of the light source is normally from 10 to 300 W.

The light fiber of the present invention was described above referring to its preferred embodiments, however, it should be noted that the present invention should not be restricted to the described embodiment. As described above, it is not essentially requested that all of the light diffusive layer is made of a light diffusive material. If it can emit light having a high brightness at a wide viewing angle, the light diffusive layer may comprise a light diffusive portion consisting of a light diffusive material in closely contact with the core (not shown). Preferably, the light diffusive portion may be provided along at least 10% of the outer peripheral direction of the core so that the light having a high brightness can be emitted at a wide viewing angle.

Then, a method of producing the light fiber will be described.

The cladding described above is basically made by a co-extrusion method of extruding two materials using two extruders in the following manner.

First, pellets of Teflon™ FEP100-J manufactured by Du Pont Co. are prepared in a predetermined amount. For example, pellets of a Neoflon™ resin containing 3% by weight of titanium oxide (trade name: FEP NP20WH) as the light diffusive material manufactured by Daikin Kogyo Co. are prepared in a predetermined amount.

When these pellets are respectively charged in each of previously prepared two extruders and then extruded through a die, the above hollow cladding comprising an inner light diffusive layer consisting of the light diffusive material only and an outer protective layer, which are integrally provided each other, can be formed.

Alternatively, two or more extruders may be used to co-extrude two or more materials, thereby forming a light diffusive layer comprising a partially exposed light diffusive portion consisting of a light diffusive material on an inner surface of the cladding.

The core can be made, for example, in the following manner. First, a monomer mixed solution is prepared by mixing a predetermined amount of 2-ethylhexyl methacrylate, a predetermined amount of n-butyl methacrylate and a predetermined amount of triethylene glycol dimethacrylate. Then, bis(4-t-butylcyclohexyl) peroxydicarbonate as a polymerization initiator is further added to the mixed solution to prepare a core precursor. Then a solid core is formed by bending the above cladding in the U-shaped form, pouring the core precursor into the cladding from one end and heating to a thermal polymerization initiation temperature. As a result, a solid core is formed, thereby to obtain a side light extraction type light fiber.

The core precursor is basically heated from the bottom portion to the top portion of the U-shaped cladding in order.

At that time, the core precursor may be contacted with an inert gas such as nitrogen, argon or the like and a pressure may be applied thereto. Then, the whole core precursor may also be heated, together with the cladding, for a predetermined time to completely react the core precursor.

EXAMPLES

The following examples further illustrate the present invention in detail but are not to be construed to limit the scope thereof.

Example 1

First, two extruders were previously prepared. Then, a Teflon™ resin (trade name: FEP100-J) having a refractive index of about 1.34 manufactured by Du Pont Co. was charged in one extruder. Furthermore, a Neoflon™ resin (trade name: FEP NP20WH) comprising a binder made of fluorinated ethylene propylene(FEP) and 3% by weight of titanium dioxide, which has a refractive index of about 1.34 and is manufactured by Daikin Kogyo Co., was charged in the other extruder.

When these resins are co-extruded through a predetermined die, a tubular cladding (having an outer diameter of about 12 mm) comprising an inner light diffusive layer ($TiO_2$ content: 3% by weight) having a wall thickness of about 30 gm and an outer protective layer having a wall thickness of about 810 gm was obtained. In this example, a cladding having a length of about 10 m was made.

To make a core, a monomer mixed solution was prepared by mixing 100 parts by weight of 2-ethyihexyl methacrylate. 100 parts by weight of n-butyl methacrylate and 2 parts by weight of triethylene glycol dimethacrylate.

To make a core bis(4-t-butylcyclohexyl) peroxydicarbonate as a polymerization initiator was further added to the monomer mixed solution to prepare a core precursor. Then, a solid core was formed by bending the above cladding in the U-shaped form, pouring the core precursor into the cladding from one end and heating to a thermal polymerization initiation temperature. As a result, a side light extraction type light fiber was obtained.

Example 2

In the same manner as that described in Example 1, except that a cladding (having an outer diameter of about 12 mm) comprising an inner light diffusive layer ($TiO_2$ content: 1% by weight) having a wall thickness of about 85 $\mu$m and an outer protective layer having a wall thickness of about 750 $\mu$m was obtained by charging a mixture of 2 kg of the above-mentioned Teflon resin and 1 kg of the Neoflon resin in the extruder in place of charging the Neoflon resin manufactured by Daikin Kogyo Co. in the other extruder and co-extruding the mixture, a light fiber was made.

Example 3

In the same manner as that described in Example 1, except that a cladding (having an outer diameter of about 12 mm) comprising an inner light diffusive layer ($TiO_2$ content: 0.27% by weight) having a wall thickness of about 70 $\mu$m and an outer protective layer having a wall thickness of about 850 $\mu$m was obtained by charging a mixture of 10 kg of the above-mentioned Teflon resin and 1 kg of the Neoflon resin in the extruder in place of charging the Neoflon resin manufactured by Daikin Kogyo Co. in the other extruder and co-extruding the mixture a light fiber was made.

Example 4

In the same manner as that described in Example 1, except that a cladding (having an outer diameter of about 12 mm) comprising an inner light diffusive layer ($TiO_2$ content: 0.14% by weight) having a wall thickness of about 130 $\mu$m and an outer protective layer having a wall thickness of about 800 $\mu$m was obtained by charging a mixture of 20 kg of the above-mentioned Teflon resin and 1 kg of the Neoflon resin in the extruder in place of charging the Neoflon resin manufactured by Daikin Kogyo Co. in the other extruder and co-extruding the mixture, a light fiber was made.

Example 5

In the same manner as that described in Example 1, except that a cladding (having an outer diameter of about 12 mm) comprising an inner light diffusive layer ($TiO_2$ content: 0.14% by weight) having a wall thickness of about 130 $\mu$m and an outer protective layer having a wall thickness of about 800 $\mu$m was obtained by charging a mixture of 10 kg of the above Teflon resin and 1 kg of a resin containing a yellow pigment. Plastic Color TFM0143 Yellow manufactured by Dainichi Seika Kogyo Co. in one extruder and charging a mixture of 20 kg of the above-mentioned Teflon resin and 1 kg of the Neflon resin in the other extruder a light fiber was made.

Comparative Example 1

In the same manner as that described in Example 1, except that a cladding (having an outer diameter of about 12 mm) comprising only a light diffusive layer ($TiO_2$ content: 3% by weight) having a wall thickness of about 800 $\mu$m was obtained by using only one extruder, charging the Neoflon resin manufactured by Daikin Kogyo Co. in the extruder and extruding through a predetermined die, a light fiber was made.

Measurement of Brightness

The brightness of light to be extracted from the side portion of the light fiber was measured in the following manner.

Describing the measurement of this brightness with reference to FIG. 2, a metal halide lamp (LBM130H: dissipation power: 130 W) manufactured by Sumitomo 3M Co. was connected to one end of each of the light fibers Examples 1 to 5 and Comparative Example 1.

The brightness was measured at a place, which is 0.3–10 m away from the light source, by using a brightness meter CS-100 (not shown) manufactured by Minolta Co. At this time, the brightness meter was arranged at the place which is 60 cm away from the light fiber. Furthermore the brightness in case of holding the light fiber in the above-described holder rail, U rail (white) manufactured by Sumitomo 3M Co. was also measured. In Table 1 below the measured results of the brightness ($cd/cm^2$) are shown.

TABLE 1

| Distance from light source (m) | | 1 | 2 | 3 | 5 | 10 |
|---|---|---|---|---|---|---|
| Example 1 | Without holder rail | 2080 | 739 | 339 | 167 | 28 |
| | With holder rail | 3800 | 1280 | 628 | 244 | |
| Example 2 | Without holder rail | 2490 | 1080 | 642 | 346 | 96 |
| | With holder rail | 4380 | 1820 | 1010 | 620 | |
| Example 3 | Without holder rail | 2100 | 1390 | 983 | 623 | 150 |
| | With holder rail | 4150 | 2530 | 1890 | 1210 | 283 |
| Example 4 | Without holder rail | 1090 | 880 | 1000 | 694 | 281 |
| | With holder rail | 2830 | 2190 | 2150 | 1540 | 666 |

TABLE 1-continued

| Distance from light source (m) | | 1 | 2 | 3 | 5 | 10 |
|---|---|---|---|---|---|---|
| Example 5 | Without holder rail | 538 | 453 | 416 | 295 | 241 |
|  | With holder rail | 658 | 525 | 469 | 390 | 292 |
| Comp. Example 1 | Without holder rail | 609 | 197 | 103 | 35 | 10 |
|  | With holder rail | 709 | 379 | 169 | 71 | 25 |

Data of Example 5 show brightness of yellow light.

According to the results described in Table 1, it is found that light having brightness higher than that of Comparative Example 1 is extracted by each of the light fibers of Examples 1 to 4. Accordingly, it is found that light having comparatively high brightness higher can be extracted from the side portion by each of the light fibers of Examples 1 to 4 according to the present invention.

It is found that, when these light fibers are held in the holder rail, the brightness of light having directivity is remarkably improved. Accordingly, it is found that, when light is extracted out from the side portion while light from the light source is introduced and then transmitted, an effect of shielding light of the light diffuse layer is small.

Subsequently a rotatable color filter (not shown) is attached to the metal halide lamp used as a light source and visible light such as blue light, orange light, green light or the like was introduced into one end in order. Then, each visible light extracted from the side portion of the light fiber was visually confirmed. As a result in case of Examples 1 to 4, each visible light can be clearly recognized. To the contrary, in case of Comparative Example 1, each visible light was recognized in a blur state and could not clearly recognized. In case of Example 5, when white light is entered from the light source, the brightness is lowered by the yellow pigment of the protective layer but the light fiber could be brighten up in yellow color from the side portion.

Effect of the Invention

As described above according to the present invention, there can be obtained a side light extraction type light fiber capable of emitting light with uniform brightness over an overall length of the comparatively long fiber. Particularly, according to the present invention there can be obtained a side light extraction type light fiber capable of extracting light having high brightness at a large viewing angle. Moreover according to the present invention such a light fiber can be simply produced. Also, such a light fiber of the present invention can be advantageously used as a linear light emitting material capable of being replaced by a neon tubing and, at the same time, the light fiber can provides a linear light emitting device capable of being replaced by a neon light emitting device.

Figure 1:
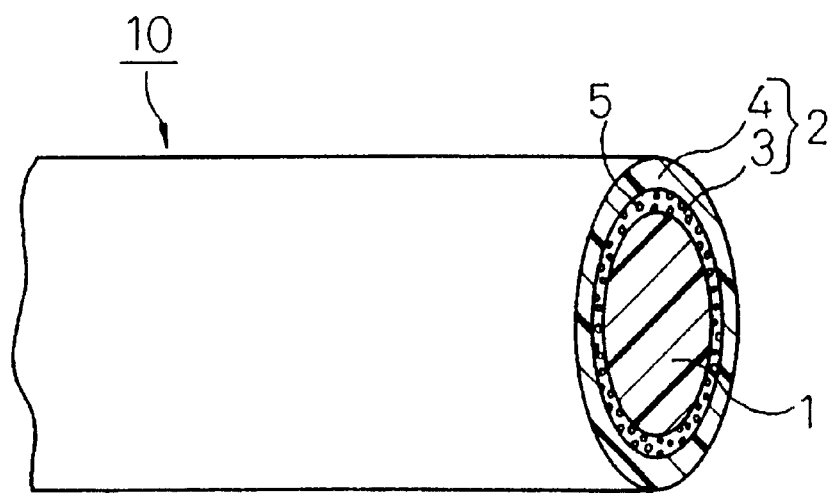
FIG. 1 is a perspective view showing one preferred embodiment of the light fiber according to the present invention with reference to one end portion of the light fiber, particularly.
Figure 2:
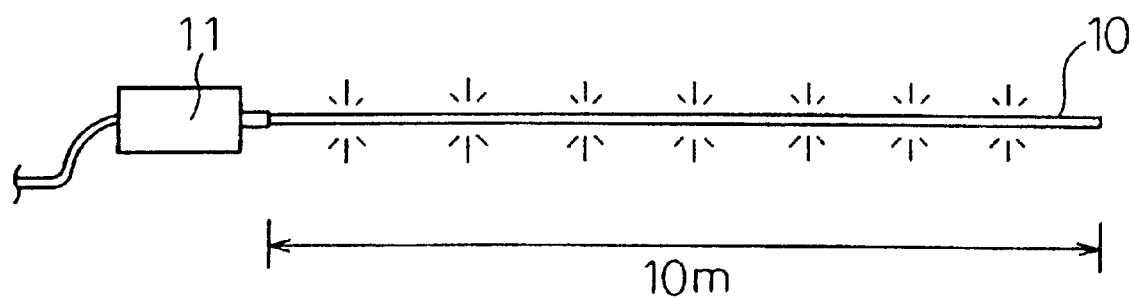
FIG. 2 is a cross-sectional view showing one embodiment of the light emitting device utilizing the light fiber according to the present invention.
Figure 3:
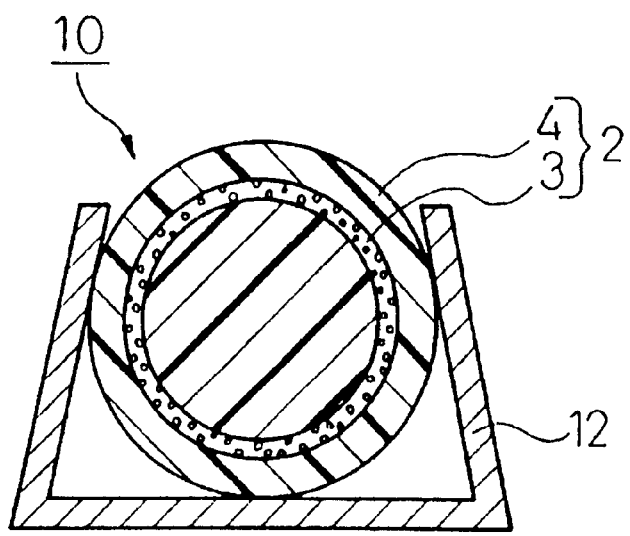
FIG. 3 is a cross-sectional view showing an embodiment wherein the light fiber is fixed by utilizing a light reflective holder.
Figure 4:
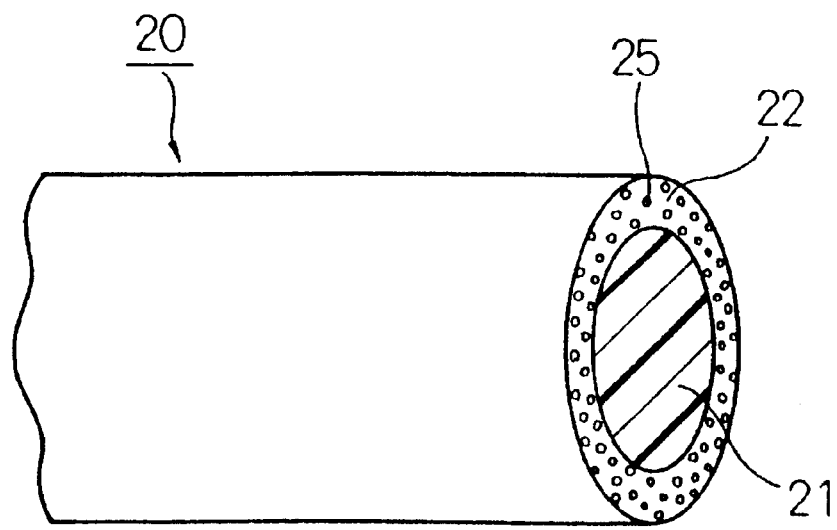
FIG. 4 is a perspective view showing one embodiment of the light fiber of the prior art.

DESCRIPTION OF REFERENCE NUMERALS 1 core
2 cladding
3 light diffusive layer
4 protective layer
5 titanium dioxide particles
10 light fiber
11 light source
12 light reflective holder rail

What is claimed is:

1. A light fiber comprising:

core in a center portion, and a cladding arranged around said core, characterized in that said cladding comprises:
　a light diffusive layer comprising a light diffusive portion made of a light diffusive material containing, as a binder, a polymer having a refractive index smaller than that of said core, which is provided in closely contact with said core in a wall thickness of 1 to 300 μm in a circumferential direction, and
　a protective layer made of a light transmitting resin material, which is formed to integrate with said light diffusive layer and covers said light diffusive layer.

2. The light fiber according to claim 1, wherein the light diffusive material contains a light scattering material in an amount of 0.01 to 10% by weight.

3. A method of producing a light fiber comprising a core in a center portion and a cladding arranged around said core, characterized in that said cladding is formed by co-extrusion of a light diffusive material containing, as a binder, a polymer having a refractive index smaller than that of said core and a light transmitting resin material so that the resulting cladding comprises:
　a light diffusive layer comprising a light diffusive portion made of said light diffusive material containing, which is provided, in closely contact with said core in a wall thickness of 1 to 300 μm in a circumferential direction, and
　a protective layer made of said light transmitting resin material, which is integrated with said light diffusive layer and covers said light diffusive layer.

4. The method of producing a light fiber according to claim 3, wherein a light scattering material is contained in the light diffusive material in an amount of 0.01 to 10% by weight.

* * * * *